United States Patent
Van De Ven

[11] Patent Number: 6,151,162
[45] Date of Patent: Nov. 21, 2000

[54] REAR PROJECTION SCREEN

[75] Inventor: Johannes C. Van De Ven, Eindhoven, Netherlands

[73] Assignee: U.S. Philips Corporation, New York, N.Y.

[21] Appl. No.: 09/210,419

[22] Filed: Dec. 11, 1998

[30] Foreign Application Priority Data

Dec. 29, 1997 [EP] European Pat. Off. .............. 97204131

[51] Int. Cl.[7] ................................... F03B 21/56
[52] U.S. Cl. .................... 359/443; 359/457; 359/456; 359/460
[58] Field of Search .................... 359/457, 456, 359/460, 443

[56] References Cited

U.S. PATENT DOCUMENTS

| | | | |
|---|---|---|---|
| 4,919,518 | 4/1990 | Ogino et al. .......................... | 350/128 |
| 5,184,224 | 2/1993 | Mitani et al. .......................... | 359/456 |
| 5,745,288 | 4/1998 | Miyata et al. .......................... | 359/457 |
| 5,751,387 | 5/1998 | Iigahama et al. ...................... | 359/457 |
| 5,870,224 | 2/1999 | Saitoh et al. .......................... | 359/456 |

FOREIGN PATENT DOCUMENTS

| | | | |
|---|---|---|---|
| 2737581 | 2/1997 | France . | |
| 2737581 | 2/1997 | Japan ............................. | G02B 3/08 |

*Primary Examiner*—Russell Adams
*Assistant Examiner*—Khaled Brown
*Attorney, Agent, or Firm*—F. Brice Faller

[57] ABSTRACT

A rear projection screen (1) comprising a lenticular structure (5) and a Fresnel structure (4). The Fresnel structure (4) has riser edges (9) and Fresnel facets (7). The Fresnel facets (7) are divided into two parts. The first part (11) encloses an angle ψ with the plane of the projection screen. The second part (13) is substantially parallel to the plane of the screen. The Fresnel structure (4) and the lenticular structure (5) are fixed to each other at the second parts of the Fresnel structure.

5 Claims, 3 Drawing Sheets

REAR PROJECTION SCREEN

BACKGROUND OF THE INVENTION

The invention relates to a rear projection screen comprising a first plate, a first side of which has a lenticular structure, and a second plate, a first side of which has a Fresnel structure with a plurality of Fresnel facets enclosing an angle ψ with the plane of the screen, a second side of the first plate and the first side of the second plate facing each other.

The invention also relates to a rear projection system comprising projection modules which can be stacked and are provided with such a rear projection screen.

A projection screen of the type described in the opening paragraph is known from, for example U.S. Pat. No. 4,919,518. This patent describes a projection screen with a Fresnel lens, a prism structure and a lenticular structure. The light to be projected is incident on the Fresnel structure and leaves the screen via the lenticular structure. An important requirement for such a projection screen is that it has a sufficient stability.

A sufficient stability can be realized in different manners. A first possibility is to render the lens structures, in other words, the Fresnel structure and the lenticular structure, sufficiently rigid by themselves by choosing the lens plates to be thick enough. However, this has the drawback that reflections in a relatively thick plate give rise to ghost images.

Another possibility is to provide a relatively thin lens plate, such as, for example a lens foil, on a separate substrate. This has the drawback that extra surfaces are created in this way, on which unwanted reflections will occur. Moreover, there will be loss of light due to light absorption in the substrate. Furthermore, the risk of accumulation of moisture between the surface of the unstable lens structure and the surface of the substrate will be considerably large as a result of the air humidity.

A further drawback of the known projection screens, notably in the case of a projection screen comprising stacked modules, is that the lens structures are exactly equally large and that it is impossible to fix them to each other without disturbing the image at the edges of a module.

SUMMARY OF THE INVENTION

It is an object of the present invention to provide a projection screen in which the combination of the lens structures is sufficiently stable and in which unwanted reflections and reduced efficiency are obviated.

To this end, the Fresnel facets are divided into a first part which encloses an angle ψ with the plane of the screen, and a second, contiguous part which is substantially parallel to the plane of the screen, the second parts of the Fresnel lens being fixed to the second side of the first plate.

Due to this measure, it is possible to fix the Fresnel structure and the lenticular structure directly to each other. A substrate for ensuring stability will then be superfluous. This has its advantages, both for a Fresnel foil and a rigid lenticular structure and for a rigid Fresnel structure and a lenticular structure in the form of a foil. Moreover, no light is lost because the truncated facets of the Fresnel structure coincide with those parts of the Fresnel structure where no projection light passes, for the following reason.

The present invention is based on the recognition that given parts of the Fresnel structure do not contribute to the formation of the image. Signal light rays which are incident on the screen will be refracted on the interface between the air and the screen. In this way, a part of each Fresnel facet will not receive light and function as a blind space. This blind space per facet becomes larger as the distance between the facet and the center of the screen becomes larger. At a given value of the distance to the center of the screen, the size of the blind space depends on the focal length. The present invention proposes to truncate the facets of the Fresnel structure, with the truncated part approximately corresponding in size to the blind space. A further advantage of this solution is that the Fresnel structure is less deep and thus becomes less vulnerable because most projecting parts are truncated.

The Fresnel structure may be a linear or a circular structure.

It is to be noted that there are projection screens of one piece in which the Fresnel structure faces the projector and the lenticular structure faces the viewer. In this way, there are no surfaces causing extra reflections, but a Fresnel structure facing the projector gives rise to a considerable loss of light. In fact, a large part of the signal light is incident on the riser edges of the Fresnel structure and is lost instead of contributing to the formation of the image.

It is further to be noted that French patent specification 2 737 581 to which U.S. Pat. No. 5,751,387 corresponds describes a Fresnel lens with truncated Fresnel facets. This Fresnel lens is used in combination with a liquid crystalline display panel and its structured surface faces the incident, unmodulated light beam. It is used for guiding the incident light as a parallel beam towards the display panel. The black strips are used to suppress ghost images.

A preferred embodiment of the projection screen according to the invention is characterized in that the Fresnel lens is fixed to the first plate by means of a black fixation agent.

Since these parts do not pass light which must contribute to the formation of the image, they may be provided with a light-absorbing material. These light-absorbing parts absorb a part of the ambient light. In this way, the image contrast on the projection screen can be enhanced without obstructing signal light.

The projection system described may be used to great advantage in an image projection system having projection modules which can be stacked. In such modules, the circumference of the lenticular structure and the Fresnel structure are equal to each other so that there is no space to fix the components of the screen to each other without detrimentally influencing the image. This problem is solved by making use of a Fresnel structure with truncated Fresnel facets. The lens structures are fixed to each other at positions which are distributed on the lens surfaces.

These and other aspects of the invention are apparent from and will be elucidated with reference to the embodiments described hereinafter.

BRIEF DESCRIPTION OF THE PREFERRED EMBODIMENT

FIG. 2(*b*) shows an embodiment of a Fresnel structure for use in a projection screen according to the invention;

FIG. 2(*c*) illustrates how blind spaces are produced;

DETAILED DESCRIPTION OF THE PREFERRED EMBODIMENTS

Figure 1:
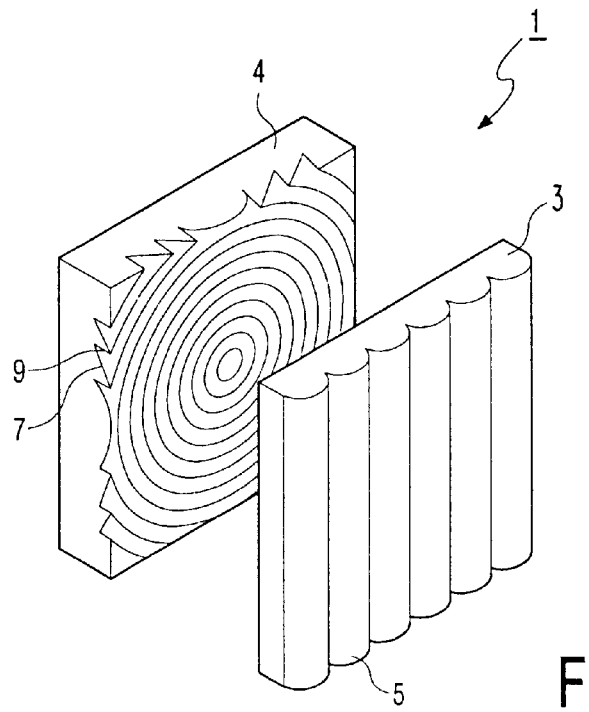
FIG. 1 shows an embodiment of a conventional projection screen.

The prior art projection screen 1 shown in FIG. 1 comprises a plate 3, one side of which has a lenticular structure 5 facing the viewer's space during use. The projection screen 1 further comprises a Fresnel structure 4 facing the plate 3 during use. The Fresnel structure consists of Fresnel facets 7 and riser edges 9. The Fresnel structure shown in FIG. 1 is circular. In the present invention, the Fresnel structure may be linear or circular. The lenticular structure is not limited to that shown in FIG. 1 but may also represent other structures having for their function to spread the signal light into the viewer's space.

Figure 2A:
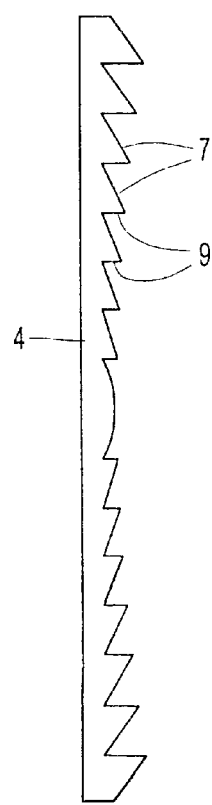
FIG. 2(*a*) shows an embodiment of a conventional Fresnel structure.
Figure 2B:
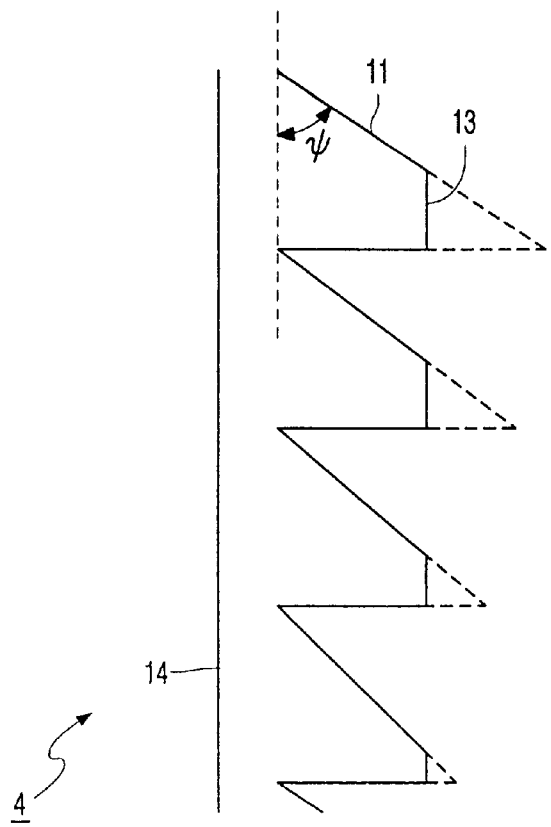
Figure 2C:
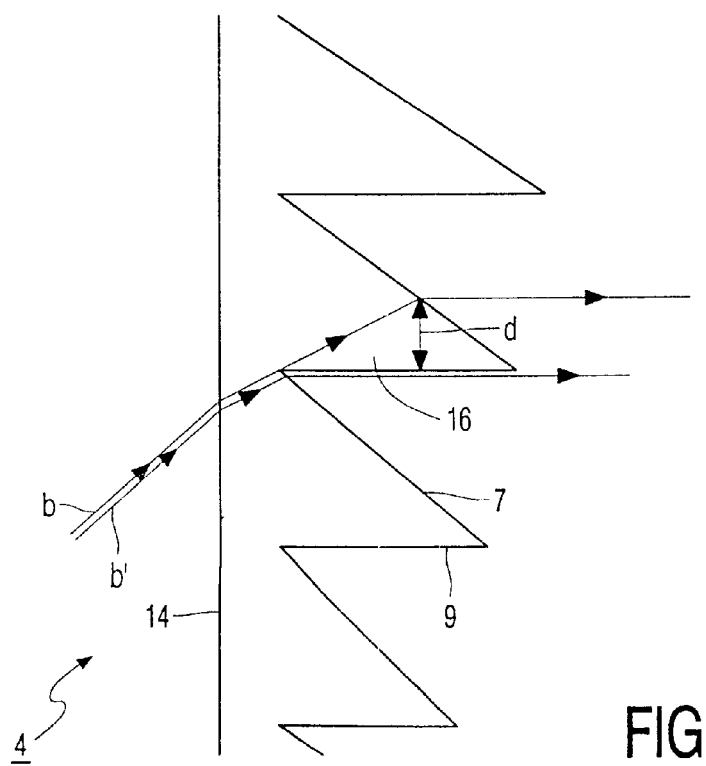

FIG. 2(*a*) shows an embodiment of a conventional Fresnel structure. The riser edges 9 become larger towards the ends of the projection screen because the Fresnel facets 7 become steeper. Consequently, the screen will be relatively vulnerable towards the ends.

FIG. 2(*c*) illustrates how blind spaces are produced in a conventional Fresnel structure. Light rays which are incident on the interface 14 between the air and the screen are refracted a first time on this interface. A ray b passes through the Fresnel lens and reaches a Fresnel facet 7 on which the light ray is again refracted. The light ray b' is refracted on the interface 14 and will undergo a second refraction on the facet located under the facet on which the light ray b was refracted. As a result, a part 16 of each Fresnel facet will not receive signal light so that it will not contribute to the formation of the image. The height d of this part 16 becomes larger as the distance between the Fresnel facets and the center of the screen becomes larger. For a given value of the distance to the center of the screen, the size of the blind space depends on the focal length of the Fresnel structure.

FIG. 2(*b*) shows a part of an embodiment of a Fresnel structure as used in a projection screen according to the invention. In the Fresnel structure of the projection screen according to the invention, the Fresnel facets 7 are divided into a first part 11 which encloses an angle $\psi$ with the plane of the screen and a second, contiguous part 13 which is substantially parallel to the plane of the screen. The size of the second part is determined by the size of the blind space.

The present invention proposes to truncate the Fresnel facets. Due to this measure, substantially no signal light is lost. By means of the truncated facets, the Fresnel structure and the lenticular structure can be fixed directly to each other. An extra substrate which is normally used to ensure some stability can therefore be dispensed with.

The reason of using a thin Fresnel structure, for example in the form of a foil, may be the creation of ghost images in a rigid Fresnel structure having a minimal thickness. By choosing the Fresnel structure to be thin enough, for example thinner than 0.5 mm, the ghost images will be located close enough together so that they can no longer be distinguished by the human eye. Such a foil is not rigid enough of itself to ensure a sufficient stability.

The Fresnel structure may be, for example a rigid structure, whereas the lenticular structure is a thin, insufficiently stable structure. Here, too, use of the invention yields a stable combination.

The present invention includes an additional aspect providing a solution to the following problem. The current image projectors whose signal light is incident on the projection screen supply beams having an intensity which decreases towards the outer side of the beam. This means that there will be less signal light at the edges of the projection screen, resulting in a decrease of the contrast. Moreover, the reflections of the ambient light are greatest at the edges of the projection screen because the Fresnel facets are steeper there. These two aspects cause the contrast at the edges of the projection screen to be very low.

In the projection screen according to the invention, a light-absorbing fixation agent 17 such as, for example black glue is provided on the truncated facets of the Fresnel structure. In this way, the contrast can be enhanced considerably. Since the blind spaces and hence the truncated facets are largest at the edges of the screen, the reflection is maximally reduced at the areas where the brightness is relatively low.

Figure 3:
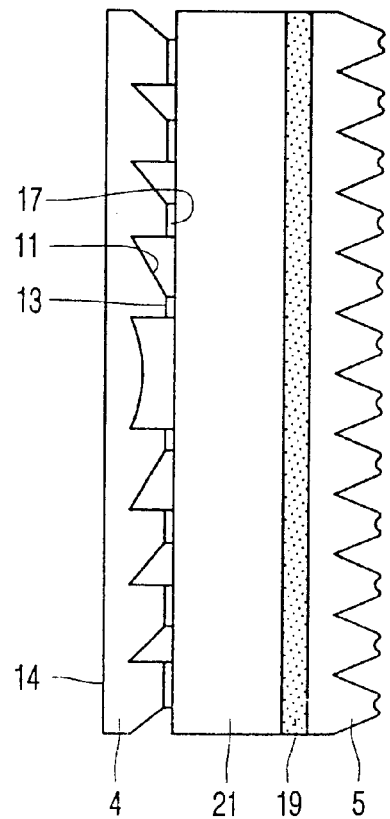
FIG. 3 is a side elevation of an embodiment of a projection screen according to the invention.

FIG. 3 shows an embodiment of a projection screen according to the invention. The Fresnel structure 4 and the lenticular structure 5 are fixed to each other by means of the truncated facets 13 and by means of a fixation agent 17 which is preferably light-absorbing. In the embodiment shown, the lenticular structure 5 is the rigid structure. This structure is present on a substrate 21 which, as usual, is provided with a diffusing material 19. In the embodiment shown, this is a strip. The diffusing material 19 may be alternatively spread on the entire substrate. The lenticular structure and the diffusing material ensure that the signal light is distributed optimally in the viewer's space. The strip of diffusing material is relatively thin in this case and is situated relatively close to the lenticular structure so that a high resolution can be realized. The diffusing material may also be distributed, for example in the lenticular structure itself. Furthermore, a second strip of diffusing material (not shown), separated from the first strip, may be present in the substrate. Speckle can be reduced in this way.

Figure 4:
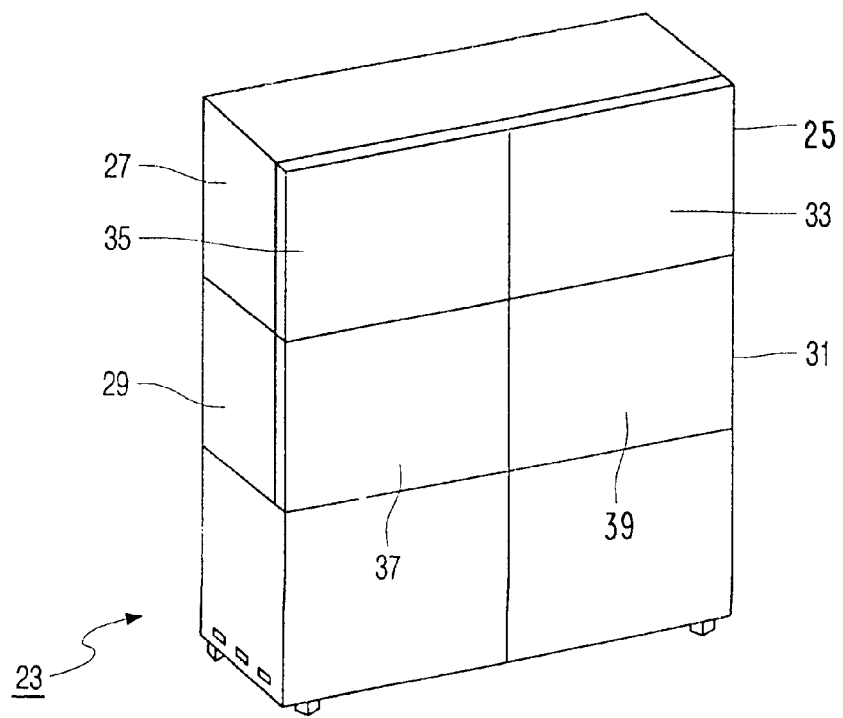
FIG. 4 shows an embodiment of a projection system with projection modules which can be stacked and with a projection screen according to the invention.

The projection screen according to the invention may be used to great advantage in an image projection system having modules which can be stacked. An embodiment of such an image projection system 23 is shown in FIG. 4. The system shown in this Figure comprises four modules 25, 27, 29 and 31. The combination comprises two columns and two rows. Each module comprises a projection screen 33, 35, 37, 39 according to the invention. The image on the edges of the projection screens is now no longer influenced detrimentally by fixing the Fresnel structure and the lenticular structure to each other, so that the images of two contiguous screens blend with each other. The reason therefor is that the Fresnel structure and the lenticular structure are fixed to each other in this case at points which are distributed across the entire screen surface. Moreover, these points of fixation do not disturb the image at all because they coincide with the blind spaces of the Fresnel structure.

The present invention thus proposes to use a Fresnel structure with truncated Fresnel facets in an image projection screen. The Fresnel facets face away from the illumination side of the screen. In this way, the Fresnel lens yields the smallest loss of signal light. The Fresnel structure and a lenticular structure are fixed to each other by means of the truncated facets. In this way, a rigid structure having a sufficient stability is realized, while the projected image is not affected thereby. In fact, the size of the truncated facets is substantially equal to the size of the blind spaces in the Fresnel structure so that substantially no signal light is lost. Moreover, the image projection screen remains well usable on its edges. By providing the truncated facets with a light-absorbing material, the image contrast on the screen is also enhanced.

What is claimed is:

1. A rear-projection screen defining a plane, said screen comprising a first plate having a first side which has a lenticular structure and an opposed second side, and a second plate having a first side which has a Fresnel structure with a plurality of Fresnel facets, wherein the Fresnel facets each comprise a first part which encloses an angle $\psi$ with the plane of the screen, and a second, contiguous part which is substantially parallel to the plane of the screen, said second parts of the Fresnel lens being fixed to the second side of the first plate.

2. A rear projection screen as claimed in claim 1, characterized in that the Fresnel lens is fixed to the first plane by means of a light absorbing fixation agent.

3. A projection system having a plurality of projection modules which can be stacked, comprising an illumination system, a modulation system, a projection lens system and an image projection screen defining a plane, wherein the image projection screen comprises a first plate having a first side which has a lenticular structure and an opposed second side, a second plate having a first side which has a Fresnel structure with a plurality of Fresnel facets, each Fresnel facet comprising a first part which encloses an angle with the plane of the screen and a second, contiguous part which is substantially parallel to the plane of the screen, said second parts being fixed to the second side of the first plate.

4. A rear projection screen as in claim 1 wherein said second side of said first plate is flat, and said second parts of said facets are coplanar.

5. A rear projection screen as in claim 2 wherein said light absorbing fixation agent is black.

* * * * *